(No Model.)
J. VOM HOFE.
FISHING REEL.
No. 488,408. Patented Dec. 20, 1892.
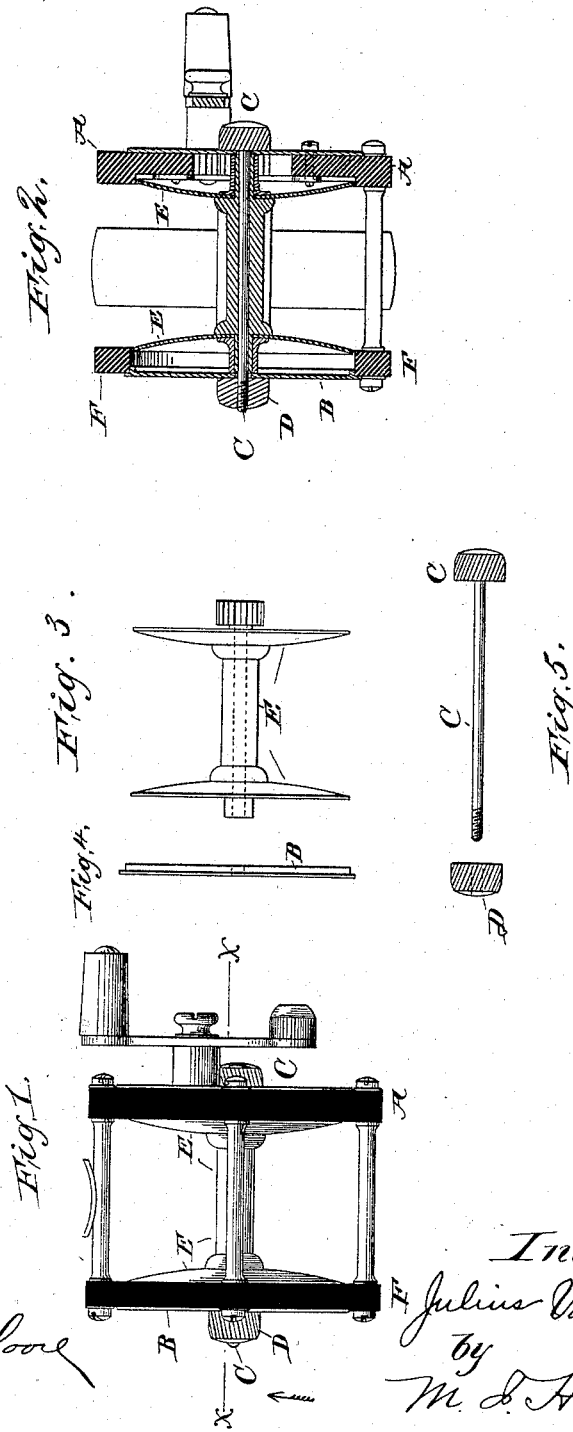

UNITED STATES PATENT OFFICE.

JULIUS VOM HOFE, OF BROOKLYN, NEW YORK.

FISHING-REEL.

SPECIFICATION forming part of Letters Patent No. 488,408, dated December 20, 1892.

Application filed July 20, 1892. Serial No. 440,666. (No model.)

*To all whom it may concern:*

Be it known that I, JULIUS VOM HOFE, a citizen of the United States, and a resident of the city of Brooklyn, in the county of Kings and State of New York, have invented a new and useful Improvement in Fishing-Reels, of which the following is a specification.

In fishing reels as usually constructed, the wearing parts can only be exposed for cleaning and lubrication, or repair, by the removal of a number of screws and the separation of the reel into its component parts. This operation is so troublesome, and so altogether beyond the mechanical skill of most of the users of such articles, that it is seldom attempted. The reel is used as a general thing till it either works so imperfectly as to be an inconvenience or until it breaks down altogether. It is then sent to the manufacturer for repairs; which repairs, though they restore the reel to operative condition, may and often do not make altogether good the permanent injury the reel has received from the neglect which it has experienced.

My invention consists of a fishing reel of the ordinary external appearance, but so constructed that in a few seconds of time and without the use of any tool whatever the spool may be removed from, or replaced in operative position and condition in, the frame of the reel. Thus all the wearing parts of the reel may be conveniently exposed for cleaning and lubrication at any moment, whereby not only is the useful life of the reel greatly prolonged but its operative condition is always at its best.

In the drawings forming part of this specification. Figure 1. represents the external appearance of a reel to which my invention is applied. Fig. 2. is a sectional elevation on the line X—X of Fig. 1. Fig. 3. is the spool of the reel; Fig. 4. is an exterior side plate of said reel; and Fig. 5. is the spindle upon which said spool revolves, together with its nut.

In the drawings A, represents the frame of the reel of any ordinary construction.

B, is a detachable plate (see Fig. 4.) perforated at its center to admit the spindle C, upon which the spool revolves.

C, is a spindle substantially of the form shown in Fig. 5. having an integral milled head at one end and a screw thread at the other.

D, is a nut fitting the screw on the small end of the spindle C.

The spool E of my reel is perforated throughout the length of its axis in such a way as to admit the spindle C, upon which the spool revolves.

The side plate of the frame of the reel on the handle side is of the ordinary construction; but that forming the opposite side of the reel (marked F, in the drawings) is annular, being so bored out that the spool of the reel may be withdrawn through its annular opening. The detachable plate B, covers and closes this annular opening, and should be counter-sunk in the side plate F so that its surface would be flush with said plate F when the parts of the reel are assembled, thereby giving to the screw end of the spindle C a steady bearing.

My invention operates as follows: Assuming the reel to be ready for use, as shown in Fig. 1. it is thus taken apart for cleaning and lubrication &c; The nut D, on the small end of the spindle C, is unscrewed, and the spindle C, is withdrawn. By pushing the spool in the direction away from the handle side of the reel, the detachable plate B, is forced out, thus uncovering the annular opening in the side plate F, through which the spool is withdrawn and all the wearing parts of the reel are exposed.

To assemble the reel, the spool is pushed into place through the annular opening in the side plate F, the detachable plate B, is placed so as to cover and close said annular opening. The spindle C, is thrust successively through a central hole in the side plate on the handle side (A) of the reel, through the axial hole in the spool and through the central hole in the detachable plate B, and the nut D, is screwed on to the end of the spindle C, &c. (all as shown in Fig. 2) and the reel is ready for use.

Thus it will be seen that the whole operation of taking part and reassembling the reel is practically reduced to removing and replacing the nut D, with the thumb and finger and that the frame of the reel need never be taken apart.

Having thus described my invention, what I claim as new and desire to patent is:—

A fishing reel frame having a side opening, a detachable plate located within the frame and covering said opening, in combination with an axially perforated spool, and a removable headed spindle passing axially through said spool and detachable plate and provided with a screw and nut, substantially as shown and described.

In testimony that I claim the foregoing as my invention I have signed my name, in presence of two witnesses, this 15th day of July, 1892.

JULIUS VOM HOFE.

Witnesses:
 COLENDFERT HART,
 HENRY P. WELLS.